US012645652B2

(12) United States Patent
Sethi et al.

(10) Patent No.: US 12,645,652 B2
(45) Date of Patent: Jun. 2, 2026

(54) DEDUPLICATION IN A MULTI-TIERED ARCHITECTURE

(71) Applicant: Dell Products L.P., Round Rock, TX (US)

(72) Inventors: Parminder Singh Sethi, Ludhiana (IN); Anay Kishore, Bangalore (IN); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/650,729

(22) Filed: Apr. 30, 2024

(65) Prior Publication Data

US 2025/0335406 A1 Oct. 30, 2025

(51) Int. Cl.
*G06F 16/215* (2019.01)

(52) U.S. Cl.
CPC .................................. *G06F 16/215* (2019.01)

(58) Field of Classification Search
None
See application file for complete search history.

(56) References Cited

U.S. PATENT DOCUMENTS

| | | | |
|---|---|---|---|
| 2010/0211987 A1* | 8/2010 | Chou | H04N 21/8352 |
| | | | 375/240.01 |
| 2015/0088816 A1* | 3/2015 | Kruglick | G06F 11/1453 |
| | | | 707/610 |
| 2019/0220210 A1* | 7/2019 | Bernat | G06F 3/0641 |
| 2021/0004427 A1* | 1/2021 | Godinez | G06F 16/958 |
| 2022/0066785 A1* | 3/2022 | Lee | G06F 11/14 |
| 2022/0129426 A1* | 4/2022 | Sohail | G06F 16/215 |
| 2024/0070287 A1* | 2/2024 | Cooney | G06F 16/958 |

OTHER PUBLICATIONS

U.S. Appl. No. 18/487,244 filed in the name of Parminder Singh Sethi et al., filed Oct. 16, 2023, and entitled "Monitoring Operation of Edge Datacenter Devices.".

* cited by examiner

*Primary Examiner* — Christopher J Raab
(74) *Attorney, Agent, or Firm* — Ryan, Mason & Lewis, LLP

(57) ABSTRACT

A method comprises collecting data corresponding to operation of one or more devices of an edge platform, performing a first deduplication process on the data, and causing transmission of at least a first portion of the data over at least one communications network to a first server based at least in part on the first deduplication process to enable the first server to perform a second deduplication process on the first portion of the data prior to transmission of at least a second portion of the data over the at least one communications network to a second server.

20 Claims, 7 Drawing Sheets

600

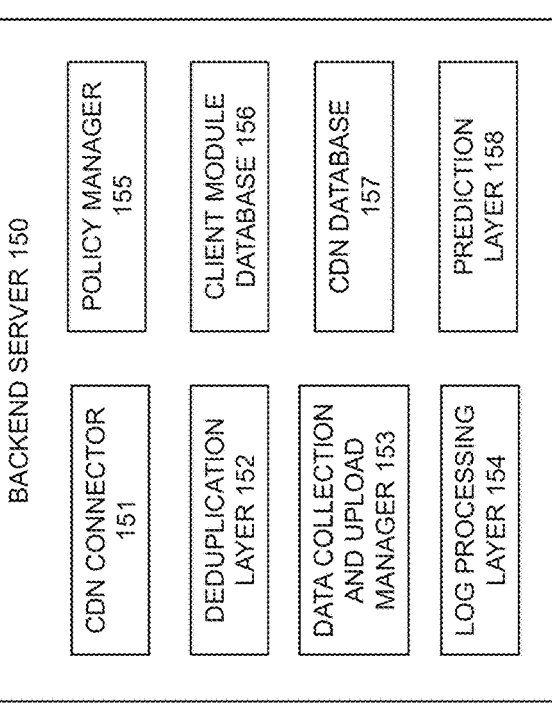

FIG. 4

BACKEND SERVER 150

CDN CONNECTOR 151

DEDUPLICATION LAYER 152

DATA COLLECTION AND UPLOAD MANAGER 153

LOG PROCESSING LAYER 154

POLICY MANAGER 155

CLIENT MODULE DATABASE 156

CDN DATABASE 157

PREDICTION LAYER 158

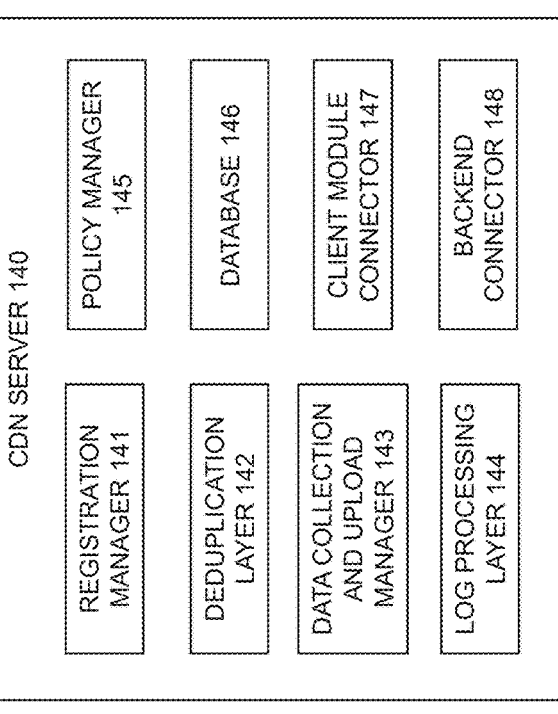

FIG. 3

CDN SERVER 140

REGISTRATION MANAGER 141

DEDUPLICATION LAYER 142

DATA COLLECTION AND UPLOAD MANAGER 143

LOG PROCESSING LAYER 144

POLICY MANAGER 145

DATABASE 146

CLIENT MODULE CONNECTOR 147

BACKEND CONNECTOR 148

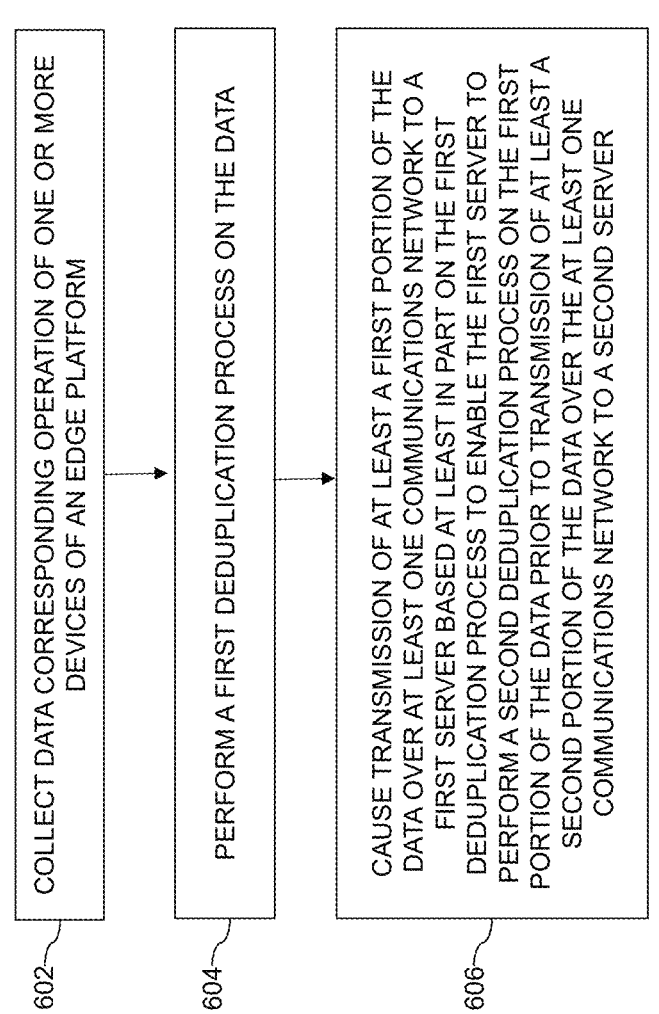

600

602 — COLLECT DATA CORRESPONDING OPERATION OF ONE OR MORE DEVICES OF AN EDGE PLATFORM

604 — PERFORM A FIRST DEDUPLICATION PROCESS ON THE DATA

606 — CAUSE TRANSMISSION OF AT LEAST A FIRST PORTION OF THE DATA OVER AT LEAST ONE COMMUNICATIONS NETWORK TO A FIRST SERVER BASED AT LEAST IN PART ON THE FIRST DEDUPLICATION PROCESS TO ENABLE THE FIRST SERVER TO PERFORM A SECOND DEDUPLICATION PROCESS ON THE FIRST PORTION OF THE DATA PRIOR TO TRANSMISSION OF AT LEAST A SECOND PORTION OF THE DATA OVER THE AT LEAST ONE COMMUNICATIONS NETWORK TO A SECOND SERVER

FIG. 6

DEDUPLICATION IN A MULTI-TIERED ARCHITECTURE

FIELD

The field relates generally to information processing systems, and more particularly to a deduplication framework.

BACKGROUND

Different processes related to vendor support for hardware and application issues typically utilize large amounts of customer processing bandwidth, resulting in significant expenditures of time and system resources. Due to the large numbers of devices that require operational support, the processes consume considerable amounts of network bandwidth when transmitting device data to backend locations for diagnosis and remediation. As a result, there is a need for improvements in the configuration of support systems without compromising the quality of support transactions.

SUMMARY

Embodiments provide techniques for using deduplication at multiple levels in an information processing system.

For example, in one embodiment, a method comprises collecting data corresponding to operation of one or more devices of an edge platform, performing a first deduplication process on the data, and causing transmission of at least a first portion of the data over at least one communications network to a first server based at least in part on the first deduplication process to enable the first server to perform a second deduplication process on the first portion of the data prior to transmission of at least a second portion of the data over the at least one communications network to a second server.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts a block diagram of components of a CDN server in an illustrative embodiment.

FIG. 4 depicts a block diagram of components of a backend server in an illustrative embodiment.

FIG. 6 depicts a process for deduplication in a multi-tiered architecture according to an illustrative embodiment.

DETAILED DESCRIPTION

Figure 1:
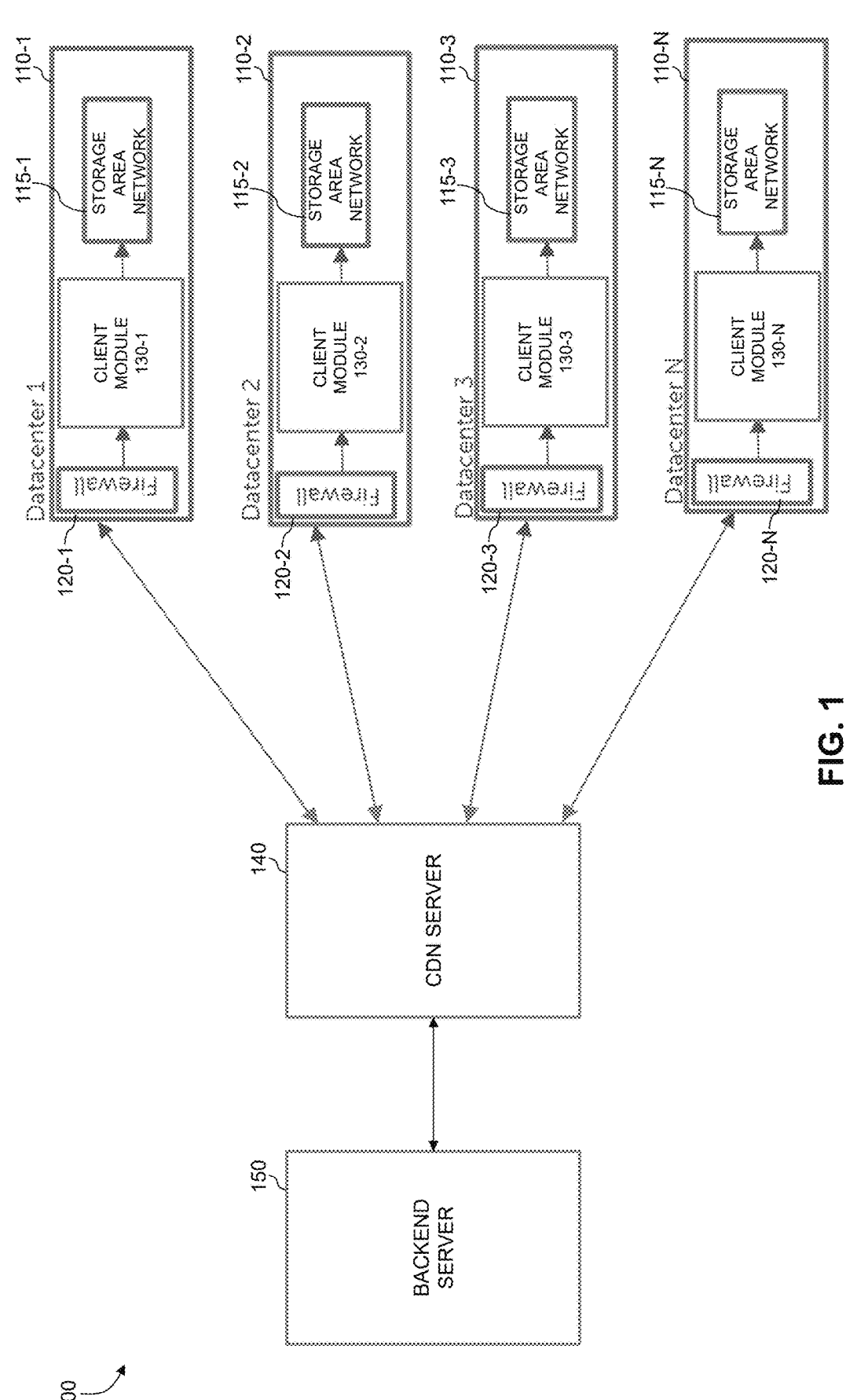
FIG. 1 depicts an information processing system with multiple edge datacenters and corresponding client modules connected to a backend server through a content delivery network (CDN) server in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous, and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

FIG. 1 shows an information processing system 100 configured in accordance with an illustrative embodiment.

The information processing system 100 comprises a plurality of datacenters 110-1, 110-2, 110-3, . . . , 110-N (collectively "datacenters 110") at respective edge locations. The datacenters 110 include respective storage area networks 115-1, 115-2, 115-3, . . . , 115-N (collectively "storage area networks 115"), respective firewalls 120-1, 120-2, 120-3, . . . , 120-N (collectively "firewalls 130") and respective client modules 130-1, 130-2, 130-3, . . . , 130-N (collectively "client modules 130"). The datacenters 110 are connected to a content delivery network (CDN) server 140, which is connected to a backend server 150.

Figure 2:
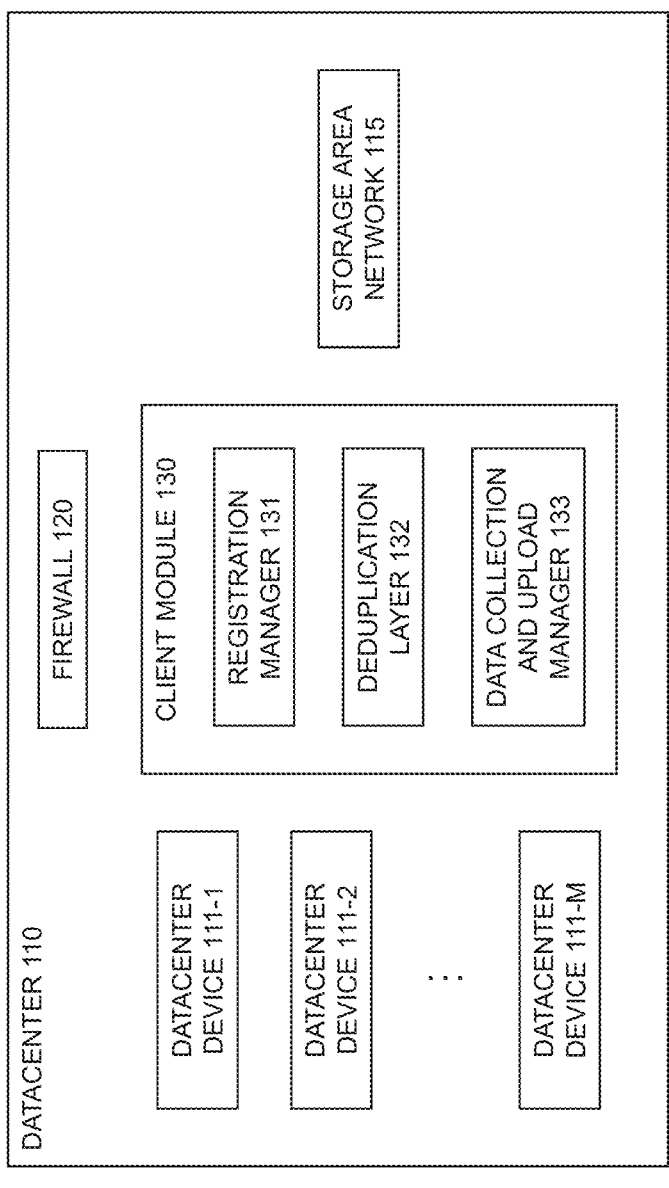
FIG. 2 depicts a block diagram of components of an edge datacenter and of a client module in an illustrative embodiment.

Referring to FIG. 2, each datacenter 110 further includes datacenter devices 111-1, 111-2, 111-M (collectively "datacenter devices 111"). In addition, as explained in more detail herein, each client module 130 includes a registration manager 131, a deduplication layer 132 and a data collection and upload manager 133. Referring to FIG. 3, as explained in more detail herein, the CDN server 140 includes a registration manager 141, a deduplication layer 142, a data collection and upload manager 143, a log processing layer 144, a policy manager 145, a database 146, a client module connector 147 and a backend connector 148. Referring to FIG. 4, as explained in more detail herein, the backend server 150 includes a CDN connector 151, a deduplication layer 152, a data collection and upload manager 153, a log processing layer 154, a policy manager 155, a client module database 156, a CDN database 157 and a prediction layer 158. The variables M and N and other similar index variables herein such as K and L are assumed to be arbitrary positive integers greater than or equal to one.

The datacenters 110 communicate over a network with the CDN server 140 and the CDN server 140 communicates over the network with the backend server 150. The datacenter devices 111 can comprise, for example, Internet of Things (IoT) devices, desktop, laptop or tablet computers, mobile telephones, or other types of processing devices. Similarly, the CDN server 140 and backend server 150 can comprise, for example, desktop, laptop or tablet computers or other types of processing devices Such devices are examples of what are more generally referred to herein as "processing devices." Some of these processing devices are also generally referred to herein as "computers." The datacenter devices 111, CDN server 140 and backend server 150 may also or alternately comprise virtualized computing resources, such as virtual machines (VMs), containers, etc. The datacenter devices 111, CDN server 140 and backend server 150 in some embodiments comprise respective computers associated with a particular company, organization or other enterprise.

The terms "user" or "client" herein are intended to be broadly construed so as to encompass numerous arrangements of human, hardware, software or firmware entities, as well as combinations of such entities. Operational data monitoring, collection and deduplication services may be provided for users utilizing one or more machine learning models, although it is to be appreciated that other types of infrastructure arrangements could be used. At least a portion of the available services and functionalities provided by the datacenter 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the datacenters 110, CDN server 140 and backend server 150, as well as to support communication between the datacenters 110, CDN server 140 and backend server 150 and connected devices and/or other related systems and devices not explicitly shown.

An edge computing architecture moves at least a portion of data processing to the periphery of a network to be closer to a data source rather than to a centralized location. In illustrative embodiments, the datacenters 110 are edge datacenters. An edge datacenter is located at an edge computing site. An edge computing site may comprise one or more edge stations or other types and arrangements of edge nodes. An edge computing site illustratively comprises a plurality of edge devices (e.g., datacenter devices 111, devices which are part of the storage area networks 115 and devices on which the client modules 130 run). Each such node of an edge computing site comprises at least one processing device that includes a processor coupled to a memory. An edge computing site illustratively executes at least portions of various workloads for system users. Such workloads may comprise one or more applications. An example edge computing site comprises a set of edge compute, storage and/or network resources. A given such set of edge resources illustratively comprises at least one of compute, storage and network resources of one or more edge devices of the corresponding edge computing site.

Edge compute resources of the edge computing site can include, for example, various arrangements of processors, possibly including associated accelerators. Edge storage resources of the edge computing site (e.g., storage area networks 115) can include, for example, one or more storage systems or portions thereof that are part of or otherwise associated with the edge computing site. A given such storage system may comprise, for example, all-flash and hybrid flash storage arrays, software-defined storage systems, cloud storage systems, object-based storage systems, and scale-out distributed storage clusters. Combinations of multiple ones of these and other storage types can also be used in implementing a given storage system in an illustrative embodiment. Edge network resources of the edge computing site can include, for example, resources of various types of network interface devices providing particular bandwidth, data rate and communication protocol features.

If there are certain issues occurring with hardware and/or software in an edge datacenter that is hosting a critical application and the issues are not monitored and/or go unchecked, this may lead to unavailability of the hardware and/or software and failure of the application to provide its corresponding services. With the number of edge datacenters and hosting platforms increasing worldwide, it is becoming increasingly difficult for enterprises to track operation of and support the datacenter devices. For example, depending on their location, the datacenters can have different types of devices and different policies and standards for operation. Additionally, there are technical problems with collection, transmission and analysis of operational data of datacenter devices from thousands of locations worldwide and/or millions of datacenter devices that may have unique operational requirements.

For example, to support datacenters of different scales, vendor support systems need to be aligned with customer information technology (IT) needs, especially when a customer has datacenters with large numbers of devices, services and applications that increase the complexity of support processes. Support processes illustratively include monitoring of datacenter devices and services for failure alerts and threats, taking periodic inventory of devices and applications, periodic, on-demand and/or alert-driven collection of operational data, transmission of operational data to vendors for analysis, creating and updating policies and definitions for alerts or other technical support issues, automated and manual support case creation and dispatching of replacement parts, and uploading and downloading of support logs, support application builds and snapshots.

As noted herein above, the different processes related to vendor support utilize large amounts of customer processing and network bandwidth and resources when transmitting device data between datacenters and backend locations for diagnosis and remediation of issues. In an attempt to address the above technical problems, the illustrative embodiments advantageously provide improvements in the configuration of support systems without compromising the quality of support transactions. In more detail, the illustrative embodiments provide a multi-tiered federated deduplication framework that decreases a support communication footprint. The multi-tiered framework includes the client modules 130 in the datacenters 110 to provide a monitoring solution in an edge location that can collect operational data from edge devices. The multi-tiered framework further includes CDN servers (e.g., CDN server 140) that are locally available to the datacenters 110 as an initial point of contact and backend servers (e.g., backend server 150) to process support requests received via the CDN servers.

As an additional advantage, the multi-tiered framework includes federated deduplication logic present in the client modules 130 and CDN servers to perform deduplication operations at different levels in order to decrease the overall communication footprint of the support processes. As a result, the amount of bandwidth and compute resources required for performance of such processes is greatly reduced when compared with conventional approaches.

Referring back to FIG. 1, the datacenters 110 communicate over a network with the CDN server 140 and the CDN server 140 communicates over the network with the backend server 150. The network is assumed to comprise a portion of a global computer network such as the Internet, although other types of networks can be part of the network, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other related communication protocols. The networks may comprise Internet Protocol version 6 (IPv6) and Internet Protocol version 4 (IPv4) configured networks. As explained in more detail herein, client modules are configured to be generic with respect to IP protocol to work with IPv4 and IPv6. For example, client modules can process the operational data of the edge device and perform other functions regardless of whether applications are ported from IPv4 to IPv6 or vice-versa.

Some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIGS. 1 and 2, a given one of the datacenters 110 includes datacenter devices 111, a storage area network 115, a firewall 120 and a client module 130. The client module 130 is connected between the firewall 120 and the remaining components of the datacenter 110. The firewall 120 provides a level of network security for the datacenter 110 to and from an external network by monitoring incoming and outgoing network traffic. The firewall 120 determines whether to allow or block specific traffic based on a defined set of security rules. The firewall 120 functions as a barrier between trusted, secured and controlled internal networks and untrusted outside networks. The firewall 120 can comprise, for example, hardware and/or software.

The storage area network 115 comprises software configured to provide high-speed shared storage for elements (e.g., datacenter devices 111, client module 130, etc.) of the datacenter 110. The storage area network 115 further comprises one or more storage devices. The storage devices comprise one or more of various types of storage devices such as hard-disk drives (HDDs), solid-state drives (SSDs), flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the storage area network 115. In this regard, the term "storage device" as used herein should be broadly construed to encompass all types of persistent storage media including hybrid drives.

Referring to FIGS. 1 and 2, the client module 130 comprises a registration manager 131, a deduplication layer 132 and a data collection and upload manager 133. The client module 130 is located in the datacenter 110 and works as an edge computing client sitting near the datacenter devices 111 where applications are deployed. As explained in more detail in connection with the information processing system 500 in FIG. 5, clusters of client modules (e.g., client modules 530) are connected with respective CDN servers (e.g., CDN servers 540-1, 540-2 and 540-3 (collectively "CDN servers 540"), which will be deployed on a zone basis based on the volume of required support. A client module 130/530 monitors the devices and components of its corresponding datacenter 110 (e.g., the datacenter devices 111 and devices of the storage area network 115 and/or components thereof) for failures, alerts and/or errors. Based on defined policies, the client modules 130/530 process the failures, alerts and/or errors. In illustrative embodiments, the client modules 130/530 perform alert-driven, on-demand and/or periodic collection of logs and operational data collection and, using the data collection and upload manager 133, upload at least a portion of the collected data to a CDN server 140/540. Prior to uploading, the deduplication layer 132 performs a first level of deduplication on the collected data.

In illustrative embodiments, a client module 130/530 runs on a standalone system with an operating system (OS) platform based on application packaging. A registration manager 131 registers a client module 130/530 with a CDN server 140/540. For example, based on a location of the client module 130/530 and a CDN server 140/540, the client module 130/530 identifies a CDN server 140/540 that is in proximity to (e.g., within a same area or region) as the client module 130/530. In other words, the client module 130/530 identifies the edge platform where the client module 130/530 is located as corresponding to a CDN server 140/540 based at least in part on the location of the edge platform with respect to the location of the CDN server 140/540. The registration manager 131 may analyze location settings of the client module 130/530 and of the CDN server 140/540 to identify a local CDN server. Registration data can be built-in to the client modules 130/530. Once registered with a CDN server 140/540, a client module 130/530 is enabled to perform support process operations. For example, a client module 130/530 will have an inventory of devices and applications within a datacenter 110 and will monitor the devices and applications for alerts based on designated policies.

In illustrative embodiments, the client modules 130/530 store collected operational data from datacenter devices 111 or other components of a datacenter 110 in a corresponding storage area network 115 of the datacenter 110. The deduplication layer 132 performs a first deduplication process on the collected data prior to data transmission to a CDN server 140/540. For example, the first deduplication process comprises determining whether transmission of the data to the CDN server 140/540 will be a first transmission of the data to the CDN server 140/540. If the transmission of the data to the CDN server 140/540 will be a first transmission of the data, the deduplication layer 132 generates one or more identifiers for the data to be transmitted to the CDN server 140/540 with the original data. In illustrative embodiments, an identifier comprises a unique identifier (e.g., universally unique identifier (UUID)) that is unique to a particular portion (e.g., chunk) of the data and occupies less memory than the original data. In some embodiments, the identifier comprises a hash value or other type of shortened value representing the particular portion of the data. The hash value may be created by the deduplication layer 132 using one or more hash functions such as, but not necessarily limited to, a cryptographic hash function which takes an input (or "message") and returns a fixed-size alphanumeric string, which is called the hash value (also a message digest, a digital fingerprint, a digest, or a checksum).

The client module 130 stores the identifiers and a mapping of the respective identifiers to their corresponding data portions in, for example, a corresponding storage area network 115. Similarly, upon receiving the identifiers with a first transmission of the data, the CDN server 140/540 maps the respective identifiers to their corresponding data portions. The CDN server 140/540 stores the identifiers and the mapping of the respective identifiers to their corresponding data portions in, for example, a corresponding database 146.

For subsequent transmissions of data after a first transmission of the data to a CDN server 140/540, the client module 130/530 sends only the identifiers corresponding to the data portions that are to be transmitted to the CDN server 140/540, and not the data itself. In other words, if data has been designated for re-transmission to a CDN server 140/540 after being previously sent to the CDN server 140/540 from a client module 130/530, the client module 130/530, via data collection and upload manager 133 and firewall 120, uploads and transmits the identifiers in place of the data that has been previously sent to the CDN server 140/540. In this case, upon receipt of the identifiers, the CDN servers 140/540 use the stored identifiers and mapping to identify the data portions corresponding to the identifiers. Based on this first level of deduplication, by transmitting only the identifiers in subsequent transmissions, the volume of data being sent from the client modules 130/530 to the CDN servers 140/540 is greatly reduced.

Figure 5:
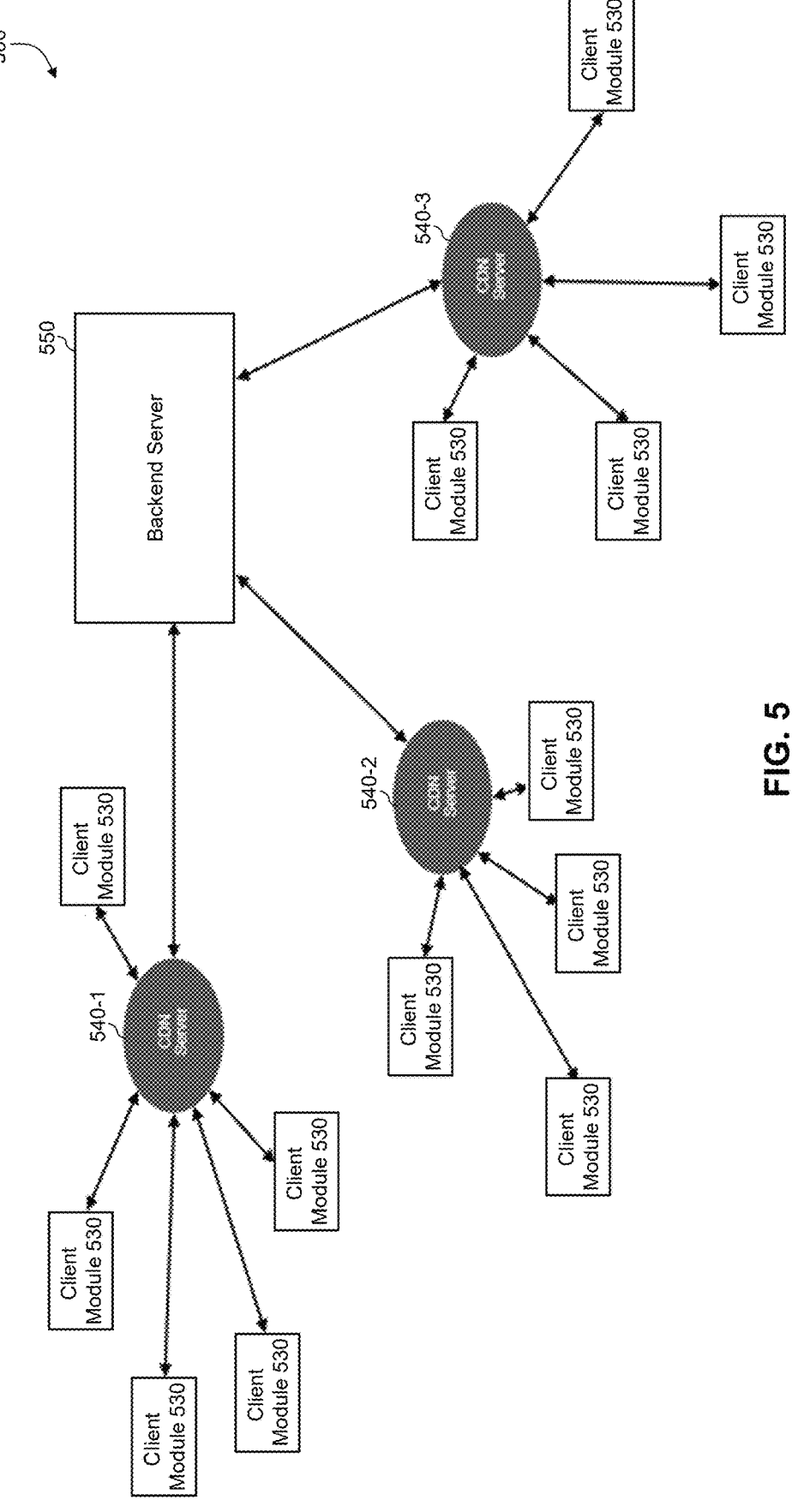
FIG. 5 depicts an architecture including multiple edge client modules connected to a backend server through respective content delivery network (CDN) servers in an illustrative embodiment.

As the number of datacenters 110, datacenter devices 111 and applications being monitored can be very high as discussed hereinabove, supporting monitoring of all the devices, services and/or applications from a centralized backend server alone is problematic. Referring to FIG. 5, multiple client modules 530 are respectively connected to CDN servers 540-1, 540-2 and 540-3. The CDN servers 540 are connected to backend server 550. The CDN servers 540 are configured the same as or similar to the CDN server 140. The backend server 550 is configured the same as or similar to the backend server 150. The CDN servers 140/540 provide local support for client modules 130/530 and are deployed on a zone level (e.g., continent/region/area based). As the number of clients can be high, it will take large amounts of processing time for all client modules 130/530 to directly communicate with a backend server 150/550. To avoid this, intermediate CDN servers 140/540 are deployed at a reachable limit for faster access to services by the client modules 130/530. Data monitoring, collection and transmission policies generated by the backend servers 150/550 can be stored at the local CDN servers 140/540 in, for example, a corresponding database 146. Different types of operational data (e.g., performance metrics, alerts or notifications of device or component errors or other issues, logs and/or sensor data), can be uploaded from the client modules 130/530 to the CDN servers 140/540, and will further be uploaded to the backend server 150/550 for additional processing and generation of enhanced definitions, policies and and/or rules for data monitoring, collection and transmission. The backend servers 150/550 will be located at a backend (e.g., of an enterprise) and function as a central service provider for all of the CDN servers 140/540. The backend servers 150/550 obtain data as uploads from the CDN servers 140/540 and process the data.

An example CDN server 140 (or 540) includes the registration manager 141, the deduplication layer 142, the data collection and upload manager 143, the log processing layer 144, the policy manager 145, the database 146, the client module connector 147 and the backend connector 148. The registration manager 141 provides registration support to all the client modules 130/530 in proximity to the CDN server 140/540 (e.g., in a designated region, zone or area near the CDN server 140/540). The registration manager 141 sends the details of each registration to the backend server 150/550.

The data collection and upload manager 143 and log processing layer 144 receive and process the different types of operational data (e.g., performance metrics, alerts or notifications of device or component errors or other issues, logs and/or sensor data) from the client modules 130/530 via the client module connector 147. The client module connector 147 implements one or more APIs to interface with a client module 130/530. The received different types of operational data can further be uploaded to the backend server 150/550 for additional processing. Similar to the deduplication layer 132, the deduplication layer 142 of a CDN server 140/540 performs a second deduplication process on the collected data prior to data transmission to a backend server 150/550. For example, the second deduplication process comprises determining whether transmission of data from the CDN server 140/540 to the backend server 150/550 will be a first transmission of the data to the backend server 150/550. If the transmission of the data to the backend server 150/550 will be a first transmission of the data to the backend server 150/550, the deduplication layer 142 generates one or more identifiers for the data to be transmitted to the backend server 150/550 with the original data. In illustrative embodiments, similar to the identifiers generated by the client module 130/530, an identifier generated by the CDN server 140/540 comprises a unique identifier (e.g. UUID), a hash value or other type of shortened value occupying less memory than the original data and which is unique to a particular portion (e.g., chunk) of the data.

The CDN server 140/540 stores the identifiers and a mapping of the respective identifiers to their corresponding data portions in, for example, a corresponding database 146. Similarly, upon receiving the identifiers with a first transmission of the data, the backend server 150/550 maps the respective identifiers to their corresponding data portions. The backend server 150/550 stores the identifiers and the mapping of the respective identifiers to their corresponding data portions in, for example, a corresponding client module database 156 or CDN database 157.

For subsequent transmissions of data after a first transmission of the data to a backend server 150/550, the CDN server 140/540 sends only the identifiers corresponding to the data portions that are to be transmitted to the backend server 150/550, and not the data itself. In other words, if data has been designated for re-transmission to a backend server 150/550 after being previously sent to the backend server 150/550 from a CDN server 140/540, the CDN server 140/540, via data collection and upload manager 143 and backend connector 148, uploads and transmits the identifiers in place of the data that has been previously sent to the backend server 150/550. In this case, upon receipt of the identifiers, the backend server 150/550 uses the stored identifiers and mapping to identify the data portions corresponding to the identifiers. Based on this second level of deduplication, by transmitting only the identifiers in subsequent transmissions, the volume of data being sent from the CDN servers 140/540 to the backend server 150/550 is greatly reduced. The backend connector 148 implements one or more APIs to interface with the backend server 150/550.

As the CDN servers 140/540 will receive data from several client modules 130/530, the deduplication layers 142 of the CDN servers 140/540 are configured to create identifiers corresponding to larger portions (e.g., chunks) of data than the identifiers created by the deduplication layers 132 of the client modules 130/530.

In accordance with illustrative embodiments, the backend server 150/550 monitors support activities globally, where such monitoring is facilitated by the CDN servers 140/540. An example backend server 150 (or 550) includes the CDN connector 151, deduplication layer 152, data collection and upload manager 153, log processing layer 154, policy manager 155, client module database 156, CDN database 157 and prediction layer 158. The backend server 150/550, via the CDN connector 151, data collection and upload manager 153 and log processing layer 154, receives and processes the different types of operational data (e.g., performance metrics, alerts or notifications of device or component errors or other issues, logs and/or sensor data) from the CDN servers 140/540. The CDN connector 151 implements one or more APIs to interface with a CDN server 140/540. As explained herein above, the CDN servers 140/540 are geographically distributed. The client module database 156 and the CDN database 157 respectively maintain details of the client modules 130/530 and the CDN servers 140/540.

Upon receiving identifiers with a first transmission of data from a CDN server 140/540, the deduplication layer 152 of the backend server 150/550 maps the respective identifiers to their corresponding data portions. As noted hereinabove, the backend server 150/550 stores the identifiers and mapping of the respective identifiers to their corresponding data portions in, for example, a corresponding client module database 156 or CDN database 157. For the subsequent transmissions of data after a first transmission of the data to the backend server 150/550, upon receipt of the identifiers, the deduplication layer 152 of the backend server 150/550 uses the stored identifiers and mapping to identify the data portions corresponding the identifiers.

The prediction layer 158 performs predictive analysis on the data. For example, the prediction layer generates predictions regarding device issues using machine learning and generates automated remedial actions based on the predictions to eliminate downtime before it occurs. According to illustrative embodiments, the collected operational data relates to the health of the datacenter devices 111, the health of storage devices and/or components (e.g., devices of the storage area networks 115) and the health of networking devices (e.g., network switches). The collected operational data may indicate changes in performance metrics (e.g., decreases in input-output operations per second (IOPS) and throughput, increases in latency, etc.). The operational data further includes, but is not necessarily limited to, server OpenManage (OM) logs, operating system (OS) utilization data, server integrated Dell® remote access controller (iDRAC) logs, server hardware configuration data, OS event logs, PowerEdge™ RAID Controller (PERC TTY) logs, debug logs, application data and storage logs. The collected data can include live and historical data, which includes, for example, system information, storage logs, OS and application data, basic input-output system (BIOS) serial logs and debug logs. The BIOS serial logs can be collected using secure shell (SSH) protocol.

Reasons for device or component failure may be detectable by the machine learning algorithms of the prediction layer 158 of the backend server 150/550. The results of the machine learning analysis of the operational data by the prediction layer 158 of the backend server 150/550 are used by the policy manager 155 to generate updated policies for processing of collected operational data by the CDN servers 140/540 and/or client modules 130/530. The CDN servers 140/540 and/or client modules 130/530 will have a defined set of policies to process error or failure alerts from datacenter devices 111 and/or components. These policies will be generated by the policy manager 155 at the backend server 150/550 and passed through the policy managers 145 of the CDN servers 140/540. The policies will be updated at different times based on updated machine learning by the backend server 150/550.

For example, the backend server 150/550 uses one or more machine learning algorithms to analyze data corresponding to the operation of the one or more datacenter devices 111 and based at least in part on the analysis, predicts one or more issues with the one or more devices. The backend server 150/550 generates one or more policies regarding processing of the data corresponding to the operation of one or more datacenter devices 111 based at least in part on the one or more issues. The client modules 130/530 receive, via a corresponding CDN server 140/540, the one or more policies from the backend server 150/550, and process data corresponding to the operation of the one or more devices according to the one or more policies.

According to illustrative embodiments, a client module 130/530 is installed within the datacenter 110 with administrator and/or root access. The CDN servers 140/540 are points of contact for the client modules 130/530 between the client modules 130/530 and the backend server 150/550. The CDN servers 140/540 can be configured according to local/regional requirements for datacenters 110 similarly located. In illustrative embodiments, the policy managers 145 of the CDN servers 140/540 are configured to store zone/region level policies for different device types. For example, the service level agreement (SLA) for similar warranty levels and/or parts replacement policies might be different in different regions. The CDN servers 140/540 are further configured to collect monitoring and alert processing policies from the backend server 150/550 and forward the monitoring and alert policies to the client modules 130/530 periodically or at designated times. As a backend server 150/550 may process a large number of policies, the CDN servers 140/540 are configured to filter policies with regional level support requirements. For example, some device models may not be released in all regions and/or the threshold for support cases and/or parts replacements may be different for different regions.

In illustrative embodiments, the backend server 150/550 runs machine learning analysis to generate predictions to identify failures, unavailability or other issues with the datacenter devices 111 and/or components, generates policies and/or rules for processing (e.g., monitoring, collecting and transmitting) operational data of the datacenter devices 111 and/or components based on the machine learning analysis and passing the policies and/or rules to the client modules 130/530 (via CDN servers 140/540) to improve data collection and prevent device unavailability.

In illustrative embodiments, the client modules 130/530 further comprise an onboard graphics processing unit (GPU) (not shown) to which datacenter monitoring related tasks can be offloaded. The onboard GPU can accommodate extra processing needs due to large amounts of operational data and monitoring efforts. The client modules 130/530 maintain an inventory of devices and components within a datacenter 110 and monitor the devices and components using different methods such as, but not necessarily limited to, simple network management protocol (SNMP) techniques, retrieval and analysis of sensor data from sensors associated with the devices and/or components and/or error logging (e.g., logging of alerts, notifications and/or errors generated by the devices and/or components), etc. In illustrative embodiments, sensors are part of the devices or components being monitored and may include, but are not necessarily limited to, temperature sensors, fan speed sensors or other sensors that might indicate hardware issues or problems. For example, temperature sensors may indicate temperatures above a designated threshold identifying issues with device operation causing unwanted heat generation.

According to one or more embodiments, storage devices of the storage area networks 115, database 146, client module database 156, CDN database 157 and other data repositories or databases referred to herein can be configured according to a relational database management system (RDBMS) (e.g., PostgreSQL). In some embodiments, the storage devices of the storage area networks 115, database 146, client module database 156, CDN database 157 and other data repositories or databases referred to herein are implemented using one or more storage systems or devices. In some embodiments, one or more of the storage systems utilized to implement the storage devices of the storage area networks 115, database 146, client module database 156, CDN database 157 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The datacenter 110, client modules 130/530, CDN servers 140/540, backend servers 150/550 and one or more elements thereof in the embodiments described herein are each assumed to be implemented using at least one processing device. Each such processing device generally comprises at least one processor and an associated memory, and implements one or more functional modules for controlling certain features of the datacenter 110, client modules 130/530, CDN servers 140/540, backend servers 150/550 and one or more elements thereof.

At least portions of the datacenter 110, client modules 130/530, CDN servers 140/540, backend servers 150/550 and one or more elements thereof may be implemented at least in part in the form of software that is stored in memory and executed by a processor. The datacenter 110, client modules 130/530, CDN servers 140/540, backend servers 150/550 and one or more elements thereof comprise further hardware and software required for running the datacenter 110, including, but not necessarily limited to, on-premises or cloud-based centralized hardware, GPU hardware, virtualization infrastructure software and hardware, Docker containers, networking software and hardware, and cloud infrastructure software and hardware.

It is assumed that the datacenter 110, client modules 130/530, CDN servers 140/540, backend servers 150/550 and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the datacenter 110, client modules 130/530, CDN servers 140/540, backend servers 150/550 and one or more elements thereof can each be implemented in the form of one or more LXCs running on one or more VMs. Other arrangements of one or more processing devices of a processing platform can be used to implement the datacenter 110, client modules 130/530, CDN servers 140/540, backend servers 150/550 and one or more elements thereof. Other portions of the systems 100 and 500 can similarly be implemented using one or more processing devices of at least one processing platform.

It is to be appreciated that these and other features of illustrative embodiments are presented by way of example only, and should not be construed as limiting in any way. Accordingly, different numbers, types and arrangements of system elements such as the datacenter 110, client modules 130/530, CDN servers 140/540, backend servers 150/550 and one or more elements thereof can be used in other embodiments.

It should be understood that the particular sets of modules and other elements implemented in the systems 100 and 500 as illustrated in FIGS. 1 and 5 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the datacenter 110, client modules 130/530, CDN servers 140/540 and/or backend servers 150/550 can be offered to cloud infrastructure customers or other users as part of FaaS, CaaS and/or PaaS offerings.

The operation of the information processing systems 100 and 500 will now be described in further detail with reference to the flow diagram of FIG. 6. With reference to FIG. 6, a process 600 for deduplication in a multi-tiered architecture as shown includes steps 602 through 606, and is suitable for use in the system 100 and/or 500 but is more generally applicable to other types of information processing systems configured for deduplication in a multi-tiered architecture.

In step 602, data corresponding to operation of one or more devices of an edge platform is collected. The data corresponding to the operation of the one or more devices may comprise, for example, one or more notifications regarding an issue with the operation of the one or more devices and/or changes in one or more performance metrics of the one or more devices. In step 604, a first deduplication process is performed on the data. The first deduplication process can be performed at the edge platform.

Step 606 includes causing transmission of at least a first portion of the data over at least one communications network to a first server based at least in part on the first deduplication process to enable the first server to perform a second deduplication process on the first portion of the data prior to transmission of at least a second portion of the data over the at least one communications network to a second server. In illustrative embodiments, the first server comprises a content delivery network server and the second server comprises a backend server.

In illustrative embodiments, the first deduplication process comprises determining that transmission of the first portion of the data to the first server will be a first transmission of the first portion of the data to the first server, and generating one or more identifiers for the first portion of the data to be transmitted to the first server in addition to the first portion of the data in response to the determining. The process may further include causing transmission of the one or more identifiers to the first server in place of the first portion of the data for one or more transmissions subsequent to the first transmission where the first portion of the data has been designated for re-transmission to the first server. The first server may be configured to store the one or more identifiers for the first portion of the data and use the one or more identifiers to identify the first portion of the data in response to receiving the one or more identifiers in the one or more transmissions subsequent to the first transmission. The first server may be configured to map the one or more identifiers to the first portion of the data.

In illustrative embodiments, the second deduplication process comprises determining that transmission of the second portion of the data to the second server will be a first transmission of the second portion of the data to the second server, and generating one or more identifiers for the second portion of the data to be transmitted to the second server in addition to the second portion of the data in response to determining that the transmission of the second portion of the data to the second server will be the first transmission of the second portion of the data to the second server. The first server may be further configured to cause transmission of the one or more identifiers for the second portion to the second server in place of the second portion of the data for one or more transmissions subsequent to the first transmission the second portion of the data to the second server where the second portion of the data has been designated for re-transmission to the second server.

The edge platform may be identified as corresponding to the first server based at least in part on a location of the edge platform with respect to a location of the first server. The second server may be configured to use one or more machine learning algorithms to analyze at least the second portion of the data and based at least in part on the analysis, to predict one or more issues with the one or more devices. The second server may also be configured to generate one or more policies regarding processing of the data corresponding to the operation of the one or more devices based at least in part on the one or more issues.

In illustrative embodiments, the one or more policies are received from the second server via the first server, and the data corresponding to the operation of the one or more devices is processed according to the one or more policies.

It is to be appreciated that the FIG. 6 process and other features and functionality described above can be adapted for use with other types of information systems configured to perform deduplication in a multi-tiered architecture.

The particular processing operations and other system functionality described in conjunction with the flow diagram of FIG. 6 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems configured with deduplication capabilities at multiple tiers as disclosed herein can provide a number of significant advantages relative to conventional arrangements. For example, federated deduplication logic is implemented at edge client module and CDN server levels, thereby reducing bandwidth, compute and network resources used in connection with transmission of operational data for datacenter support processes. Unlike conventional approaches, a first level of deduplication is performed at edge locations and a second level of deduplication is performed at CDN servers to decrease operational expenditures in technical support scenarios.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing systems 100 and 500 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the datacenter 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and datacenter in illustrative embodiments. These and other cloud-based systems in illustrative embodiments can include object stores.

Illustrative embodiments of processing platforms will now be described in greater detail with reference to FIGS. 7 and 8. Although described in the context of system 100 and/or 500, these platforms may also be used to implement at least portions of other information processing systems in other embodiments.

Figure 7:
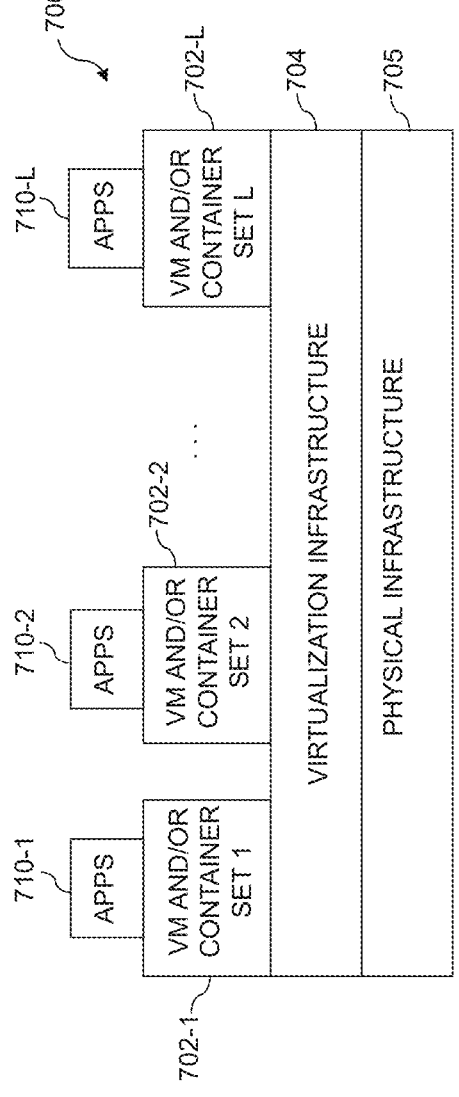
FIGS. 7 and 8 show examples of processing platforms that may be utilized to implement at least a portion of an information processing system according to illustrative embodiments.
Figure 8:
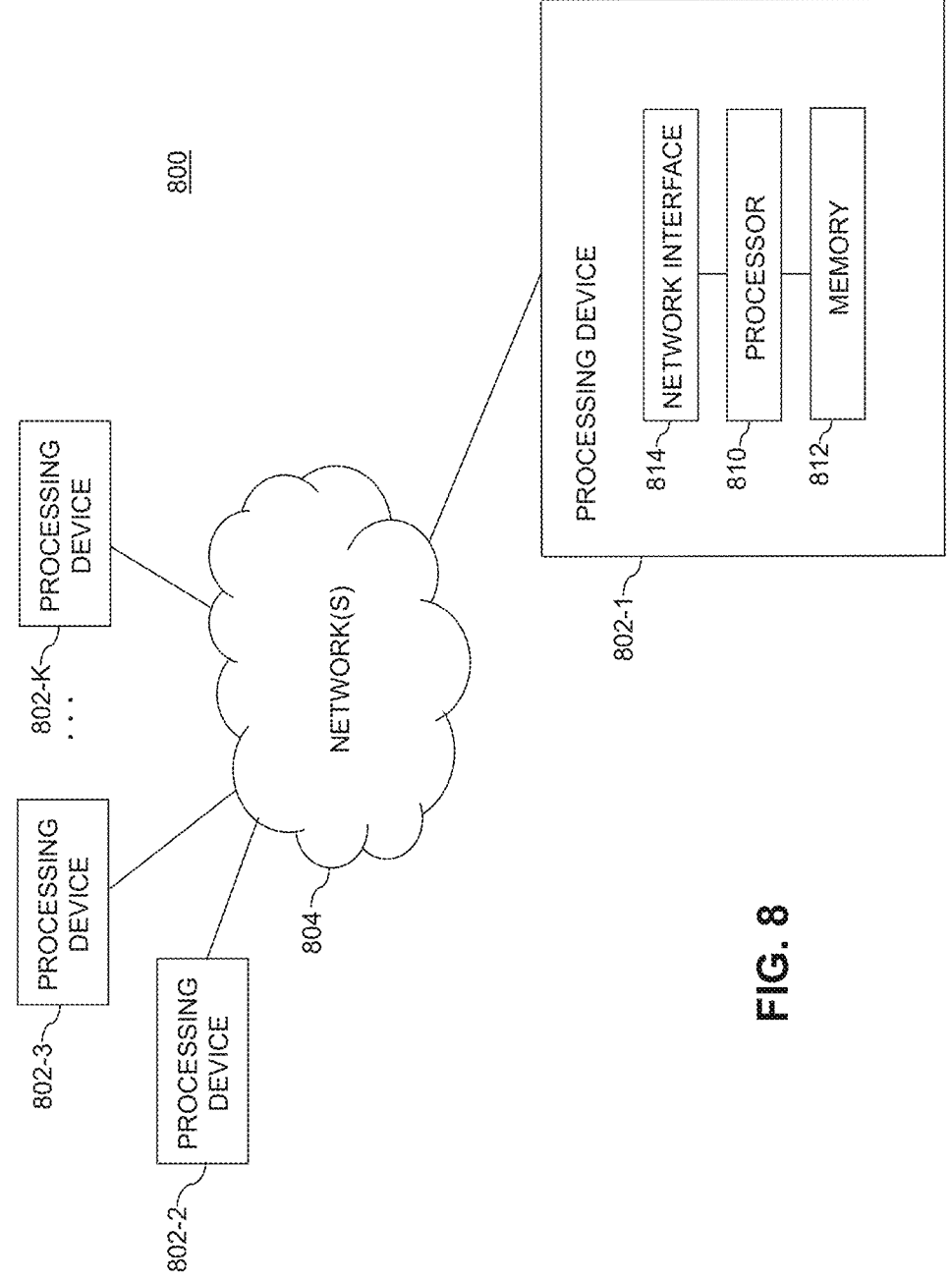

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 and/or 500 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 and/or 500 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the system 100 and/or 500 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and datacenters. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

collecting data corresponding to operation of one or more devices of an edge platform;

performing a first deduplication process on the data; and causing transmission of at least a first portion of the data over at least one communications network to a first server, wherein the first server comprises a content delivery network server, based at least in part on the first deduplication process to enable the first server to perform a second deduplication process on the first portion of the data prior to transmission of at least a second portion of the data over the at least one communications network to a second server, wherein the transmission of at least a second portion of the data is based at least in part on the second deduplication process, and the second server comprises a backend server;

wherein the steps of the method are executed by a processing device operatively coupled to a memory.

2. The method of claim 1 wherein the first deduplication process is performed at the edge platform.

3. The method of claim 1 wherein the first deduplication process comprises:

determining that transmission of the first portion of the data to the first server will be a first transmission of the first portion of the data to the first server; and generating one or more identifiers for the first portion of the data to be transmitted to the first server in addition to the first portion of the data in response to the determining.

4. The method of claim 3 further comprising causing transmission of the one or more identifiers to the first server in place of the first portion of the data for one or more transmissions subsequent to the first transmission where the first portion of the data has been designated for re-transmission to the first server.

5. The method of claim 4 wherein the first server is configured to store the one or more identifiers for the first portion of the data and use the one or more identifiers to identify the first portion of the data in response to receiving the one or more identifiers in the one or more transmissions subsequent to the first transmission.

6. The method of claim 3 wherein the first server is configured to store the one or more identifiers for the first portion of the data and map the one or more identifiers to the first portion of the data.

7. The method of claim 3 wherein the second deduplication process comprises:

determining that transmission of the second portion of the data to the second server will be a first transmission of the second portion of the data to the second server; and generating one or more identifiers for the second portion of the data to be transmitted to the second server in addition to the second portion of the data in response to determining that the transmission of the second portion of the data to the second server will be the first transmission of the second portion of the data to the second server.

8. The method of claim 7 wherein the first server is configured to cause transmission of the one or more identifiers for the second portion to the second server in place of the second portion of the data for one or more transmissions subsequent to the first transmission the second portion of the data to the second server where the second portion of the data has been designated for re-transmission to the second server.

9. The method of claim 1 wherein the first server comprises a content delivery network server and the second server comprises a backend server.

10. The method of claim 1 further comprising identifying the edge platform as corresponding to the first server based at least in part on a location of the edge platform with respect to a location of the first server.

11. The method of claim 1 wherein the data corresponding to the operation of the one or more devices comprises one or more notifications regarding an issue with the operation of the one or more devices.

12. The method of claim 1 wherein the data corresponding to the operation of the one or more devices comprises changes in one or more performance metrics of the one or more devices.

13. The method of claim 1 wherein:

the second server is configured to use one or more machine learning algorithms to analyze at least the second portion of the data and based at least in part on the analysis, to predict one or more issues with the one or more devices; and the second server is configured to generate one or more policies regarding processing of the data corresponding to the operation of the one or more devices based at least in part on the one or more issues.

14. The method of claim 13 further comprising:

receiving, via the first server, the one or more policies from the second server; and processing the data corresponding to the operation of the one or more devices according to the one or more policies.

15. An apparatus comprising:

a processing device comprising a hardware-based processor operatively coupled to a memory and configured:

to collect data corresponding operation of one or more devices of an edge platform;

to perform a first deduplication process on the data; and to cause transmission of at least a first portion of the data over at least one communications network to a first server, wherein the first server comprises a content delivery network server, based at least in part on the first deduplication process to enable the first server to perform a second deduplication process on the first portion of the data prior to transmission of at least a second portion of the data over the at least one communications network to a second server, wherein the transmission of at least a second portion of the data is based at least in part on the second deduplication process, and the second server comprises a backend server.

16. The apparatus of claim 15 wherein the first deduplication process comprises:

determining that transmission of the first portion of the data to the first server will be a first transmission of the first portion of the data to the first server; and generating one or more identifiers for the first portion of the data to be transmitted to the first server in addition to the first portion of the data in response to the determining.

17. The apparatus of claim 16 wherein the processing device is further configured to cause transmission of the one or more identifiers to the first server in place of the first portion of the data for one or more transmissions subsequent to the first transmission where the first portion of the data has been designated for re-transmission to the first server.

18. An article of manufacture comprising a non-transitory processor-readable storage medium having stored therein program code of one or more software programs, wherein the program code when executed by at least one processing device causes said at least one processing device to perform the steps of:

collecting data corresponding to operation of one or more devices of an edge platform;

performing a first deduplication process on the data; and causing transmission of at least a first portion of the data over at least one communications network to a first server, wherein the first server comprises a content delivery network server, based at least in part on the first deduplication process to enable the first server to perform a second deduplication process on the first portion of the data prior to transmission of at least a second portion of the data over the at least one communications network to a second server, wherein the transmission of at least a second portion of the data is based at least in part on the second deduplication process, and the second server comprises a backend server.

19. The article of manufacture of claim 18 wherein the first deduplication process comprises:

determining that transmission of the first portion of the data to the first server will be a first transmission of the first portion of the data to the first server; and generating one or more identifiers for the first portion of the data to be transmitted to the first server in addition to the first portion of the data in response to the determining.

20. The article of manufacture of claim 19 wherein the program code further causes said at least one processing device to perform the step of causing transmission of the one or more identifiers to the first server in place of the first portion of the data for one or more transmissions subsequent to the first transmission where the first portion of the data has been designated for re-transmission to the first server.

* * * * *